US012770517B2

(12) United States Patent
Nguyen et al.

(10) Patent No.: US 12,770,517 B2
(45) Date of Patent: Oct. 20, 2026

(54) PRIVACY PRESERVING GEOFENCING SYSTEM AND METHOD THEREOF

(71) Applicant: HCL Technologies Limited, New Delhi (IN)

(72) Inventors: Duc Cuong Nguyen, Hanoi (VN); Simy Chacko, Chennai (IN); Dhanyamraju S U M Prasad, Hyderabad (IN)

(73) Assignee: HCL Technologies Limited, New Delhi (IN)

( * ) Notice: Subject to any disclaimer, the term of this patent is extended or adjusted under 35 U.S.C. 154(b) by 349 days.

(21) Appl. No.: 18/396,760

(22) Filed: Dec. 27, 2023

(65) Prior Publication Data

US 2024/0221508 A1 Jul. 4, 2024

(30) Foreign Application Priority Data

Dec. 28, 2022 (IN) ............................ 202211076299

(51) Int. Cl.

| | |
|---|---|
| ***G08G 1/00*** | (2006.01) |
| ***B60R 25/04*** | (2013.01) |
| ***H04L 9/00*** | (2022.01) |
| ***H04W 4/021*** | (2018.01) |

(52) U.S. Cl.

CPC ............ *G08G 1/207* (2013.01); *B60R 25/04* (2013.01); *H04L 9/008* (2013.01); *H04W 4/021* (2013.01); *B60R 2025/0415* (2013.01)

(58) Field of Classification Search

None

See application file for complete search history.

(56) References Cited

U.S. PATENT DOCUMENTS 8,472,627 B2 6/2013 Denning et al.
8,971,930 B2 3/2015 Li et al.
9,137,631 B2 9/2015 Nawaz et al.
(Continued)

OTHER PUBLICATIONS

Guangcan Yang, Shoushan Luo, Yang Xin, Hongliang Zhu, Jingkai Wang, Mingzhen Li, and Yunfeng Wan; A Search Efficient Privacy-Preserving Location-Sharing Scheme in Mobile Online Social Networks; 10-23; MDPI; Switzerland; Nov. 25, 2020.
(Continued)

*Primary Examiner* — Adolf Dsouza
(74) *Attorney, Agent, or Firm* — Kendal M. Sheets

(57) ABSTRACT

A privacy preserving geofencing system and method are disclosed. The method includes receiving a current location data of a vehicle. The current location data is homomorphically encrypted through a homomorphic encryption technique. The method further includes randomly generating at least two secure values corresponding to the current location data of the vehicle. The method further includes combining the at least two secure values with the current location data of the vehicle. The method further includes sharing a combination of the current location data and the at least two secure values to a computing server. The method further includes computing the current location data of the vehicle obfuscated with the at least two secure values to obtain a computed result. The computed result determines if the vehicle is within a predefined geofencing region based on one or more geofencing criteria.

15 Claims, 5 Drawing Sheets

(56) References Cited

U.S. PATENT DOCUMENTS

| | | | | |
|---|---|---|---|---|
| 10,439,799 | B2 | 10/2019 | Diallo et al. | |
| 10,510,193 | B2 | 12/2019 | Wells et al. | |
| 11,138,321 | B2 | 10/2021 | Gryb et al. | |
| 2009/0243925 | A1 * | 10/2009 | Kellermeier | G08B 13/14 342/357.64 |
| 2018/0139054 | A1 * | 5/2018 | Chu | H04L 9/008 |
| 2021/0243595 | A1 * | 8/2021 | Buck | G06F 21/604 |
| 2022/0239463 | A1 * | 7/2022 | Boudguiga | H04L 9/008 |
| 2025/0036802 | A1 * | 1/2025 | Choncholas | G06F 21/6254 |

OTHER PUBLICATIONS

Michael Guldner, Torsten Spieldenner, Rene Schubotz; Nexus: Using Geo-fencing Services without revealing your Location; Germany.

Carmen Lee; Privacy-preserving proof-of-location using homomorphic encryption; Uppsala Universitet, pp. 1-41, Jun. 2020.

* cited by examiner

PRIVACY PRESERVING GEOFENCING SYSTEM AND METHOD THEREOF

TECHNICAL FIELD

This disclosure relates generally to privacy protection, and more particularly to a system and method for privacy preserving geofencing using homomorphic encryption techniques.

BACKGROUND

User's location is one of the important data that may be required in many software applications for providing services, such as, for finding nearby shops, restaurants, malls, hotels, geofencing, and alike. However, while providing these services to the user, many software applications may reveal the user's location to third parties. This may threaten user's privacy as they may be tracked without their consent.

At present, there exist various techniques that may provide geofencing service to monitor a vehicle and notifies the user when the vehicle moves outside of a predefined geofencing region. However, the user's privacy in the existing techniques may be compromised as their location may be stored in a cloud server. As a result of which the stored location may be stolen by stalkers or strangers for their own benefits. Further, communication scheme used in the existing techniques may require multiple back and forth commutation between client and server which may increase complexity, time, and cost.

Therefore, in order to provide solutions to the aforementioned drawback, there exists a need to develop an effective privacy preserving geofencing system and method that may accurately monitor if user's vehicle is within the predefined geofencing region without revealing their location.

SUMMARY

In one embodiment, a privacy preserving geofencing method is disclosed. In one example, the method may include receiving a current location data of a vehicle. It may be noted that the current location data may be homomorphically encrypted through a homomorphic encryption technique. The method may further include randomly generating at least two secure values corresponding to the current location data of the vehicle. The method may further include combining the at least two secure values with the current location data of the vehicle. The method may further include sharing a combination of the current location data and the at least two secure values to a computing server. The method may further include computing the current location data of the vehicle obfuscated with the at least two secure values to obtain a computed result. It should be noted that the computed result may determine if the vehicle is within a predefined geofencing region based on one or more geofencing criteria.

In another embodiment, a privacy preserving geofencing system is disclosed. In one example, the system may include a processor and a memory communicatively coupled to the processor. The memory store processor-executable instructions, which, on execution, may cause the processor to receive a current location data of a vehicle. It should be noted that the current location data may be homomorphically encrypted through a homomorphic encryption technique. The processor-executable instructions, on execution, may further cause the processor to randomly generate at least two secure values corresponding to the current location data of the vehicle. The processor-executable instructions, on execution, may further cause the processor to combine the at least two secure values with the current location data of the vehicle. The processor-executable instructions, on execution, may further cause the processor to share a combination of the current location data and the at least two secure values to a computing server. The processor-executable instructions, on execution, may further cause the processor to compute the current location data of the vehicle obfuscated with the at least two secure values to obtain a computed result. It should be noted that the computed result may determine if the vehicle is within a predefined geofencing region based on one or more geofencing criteria.

In yet another embodiment, a non-transitory computer-readable medium storing computer-executable instruction for privacy preserving geofencing is disclosed. The stored instructions, when executed by a processor, may cause the processor to perform operations including receiving a current location data of a vehicle. It should be noted that the current location data may be homomorphically encrypted through a homomorphic encryption technique. The operations may further include randomly generating at least two secure values corresponding to the current location data of the vehicle. The operations may further include combining the at least two secure values with the current location data of the vehicle. The operations may further include sharing a combination of the current location data and the at least two secure values to a computing server. The operations may further include computing the current location data of the vehicle obfuscated with the at least two secure values to obtain a computed result. It should be noted that the computed result may determine if the vehicle is within a predefined geofencing region based on one or more geofencing criteria.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
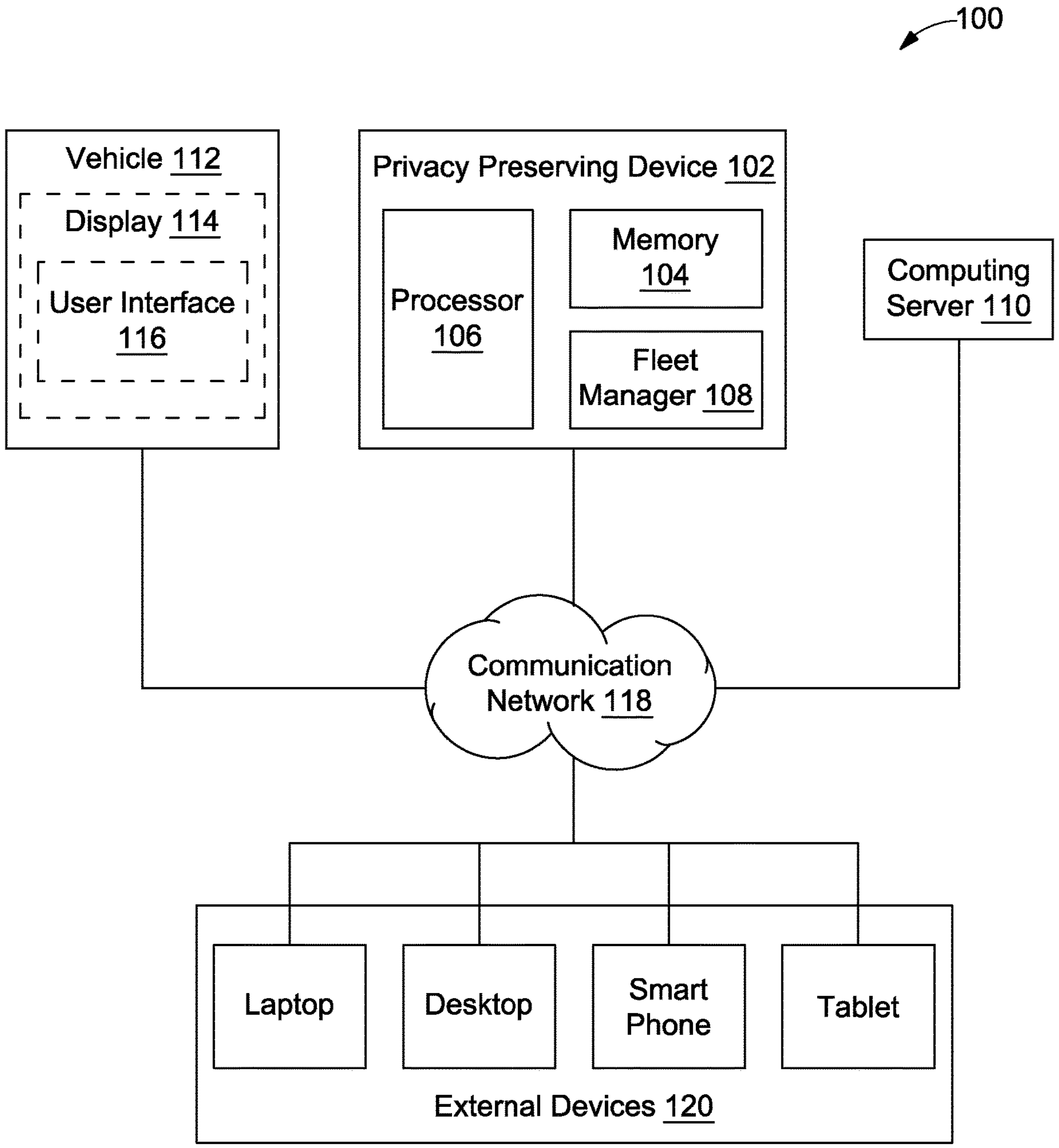
FIG. 1 illustrates a block diagram of a privacy preserving geofencing system, in accordance with some embodiments of the present disclosure.

Referring now to FIG. 1, a block diagram of a privacy preserving geofencing system 100 is illustrated, in accordance with some embodiment of the present disclosure. The system 100 may include a privacy preserving device 102 that may be capable of preserving privacy of user's vehicle during geofencing using a homomorphic encryption technique. In particular, the privacy preserving device 102 may provide a mechanism to monitor if a vehicle is within a predefined geofencing region without revealing user location.

Thus, the system 100 may resolve aforementioned problems by employing the homomorphic encryption technique on computations of user's geographic location. The homomorphic encryption may allow computation on encrypted data without having to decrypt it. In particular, only a party that possess encryption key may decrypt and read the data. Therefore, encrypting location before sharing with computing server protects user's privacy. Hence, the system 100 may be employed for one or more applications, for example, in case of a car rental, a car rental company may employ the system 100 to monitor if the car is in a predefined registered area (i.e., the predefined geofencing region) or not, yet they do not have to track user's location. Similarly, a government agency may employ the system 100 to monitor if the vehicle is in a predefined city (i.e., the predefined geofencing region) without having to know vehicle's location.

Further, the privacy preserving device 102 may include a memory 104, a processor 106, and a fleet manager 108. As depicted via the present FIG. 1, the privacy preserving device 102 may further be connected to a computing server 110 and a vehicle 112 and via a communication network 118. Examples of the privacy preserving device 102 may include, but are not limited to, a server, a desktop, a laptop, a notebook, a tablet, a smartphone, a mobile phone, an application server, or the like. Further, examples of the computing server 110 may include, but is not limited to, a server, a desktop, a laptop, a notebook, a tablet, a smartphone, a mobile phone, an application server, or the like. The memory 104 may store instructions that, when executed by the processor 106, cause the processor 106 to initiate a privacy preserving geofencing process.

As will be described in greater detail in conjunction with FIG. 2 to FIG. 4, in order to initiate the process of privacy preserving geofencing, initially the fleet manager 108 may receive a current location data of the vehicle 112. The current location data of the vehicle 112 may be in homomorphically encrypted format. It should be noted that the current location data of the vehicle 112 may be homomorphically encrypted through the homomorphic encryption technique before sharing it to the fleet manager 108. Further, the fleet manager 108 may randomly generate at least two secure values corresponding to the current location data of the vehicle 112. Thereafter, the fleet manager 108 may combine the at least two secure values with the current location data of the vehicle 112. Further, the fleet manager 108 may share a combination of the current location data and the at least two secure values to the computing server 110. The computing server 110 may further compute the current location data of the vehicle 112 obfuscated with the at least two secure values to obtain a computed result.

The memory 104 may also store various data (e.g., homomorphically encrypted location data of the vehicle 112, predefined geofencing region data, computed result in an encrypted form, etc.) that may be captured, processed, and/or required by the privacy preserving device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

The privacy preserving device 102 may interact with the user of the vehicle 112 via a Global Positioning System (GPS) for sending and receiving data. In particular, the privacy preserving device 102 may interact with the user via a user interface 116 accessible via the display 114. Thus, for example, in some embodiments, the privacy preserving device 102 may render the user interface 116 to enable the user to homomorphically share the location data of the vehicle 112 to the fleet manager 108 via the GPS.

In some embodiments, the privacy preserving device 102 may interact with one or more external devices 120 over the communication network 118 to render computed results (i.e., whether the vehicle 112 is within or outside of the predefined geofencing region) to the user or owner of the vehicle 112. The one or more external devices 120 may include, but may not be limited to, a desktop, a laptop, a notebook, a netbook, a tablet, a smartphone, a remote server, a mobile phone, or another computing system/device. The communication network 118 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

As will be appreciated by one skilled in the art, a variety of processes may be employed for performing privacy preserving geofencing process. For example, the system 100 and the associated privacy preserving device 102 may perform privacy preserving geofencing process by the processes discussed herein. In particular, as will be appreciated by those of ordinary skill in the art, control logic and/or automated routines for performing the techniques and steps described herein may be implemented by the system 100 and the associated privacy preserving device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be included in the one or more processors on the system 100.

Figure 2:
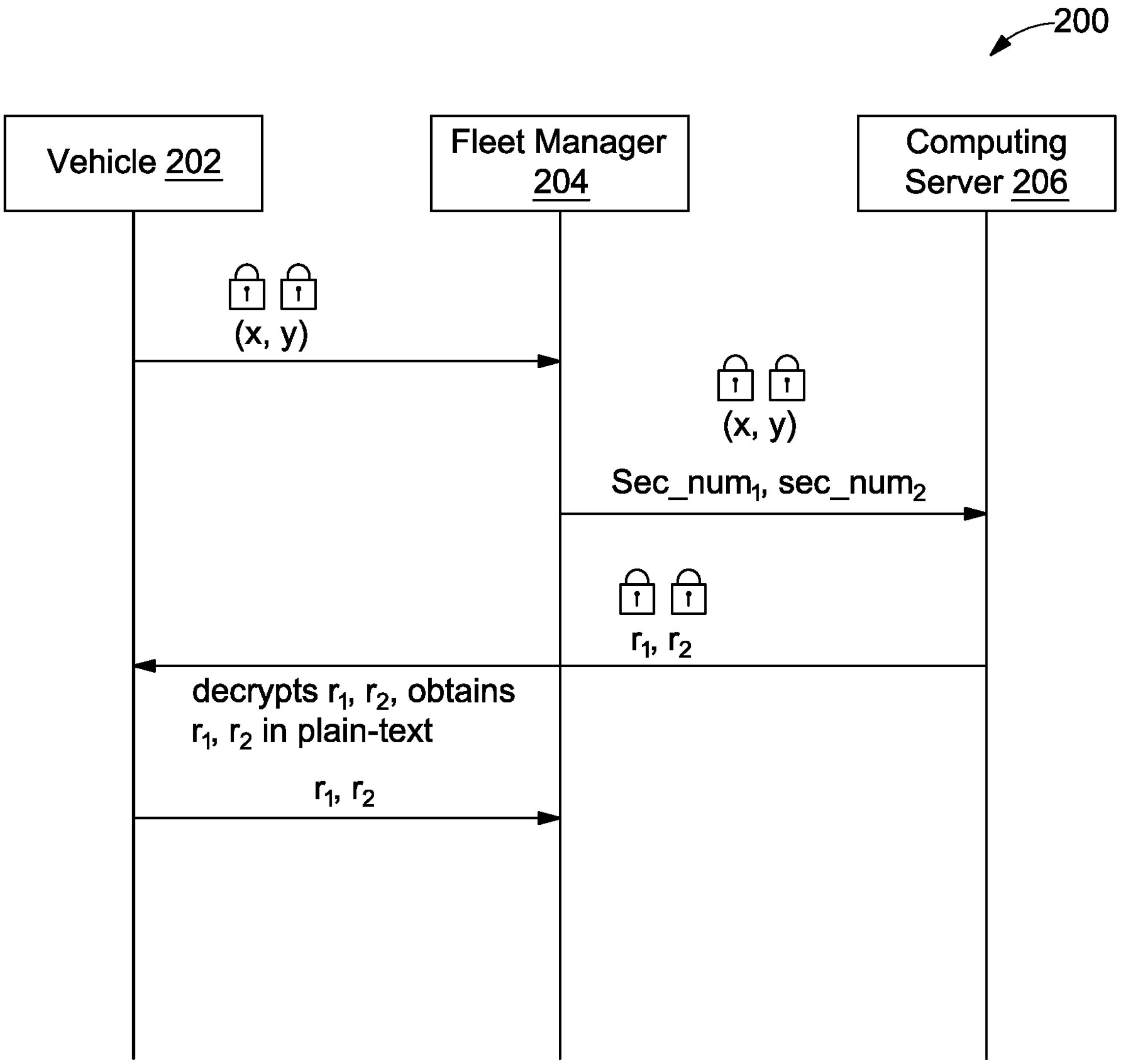
FIG. 2 illustrates a communication scheme for preserving privacy of a geofencing system, in accordance with some embodiments of the present disclosure.

Referring now to FIG. 2, a communication scheme 200 for privacy preserving geofencing system 100 is illustrated, in accordance with some embodiments of the present disclosure. The communication scheme 200 may include at least three parties. A first party may be a vehicle 202 that needs to provide its location data periodically in an encrypted format. A second party may be a fleet manager 204 that needs to know if the vehicle 202 is inside or outside a predefined geofencing region without knowing the vehicle's actual location and a third party may be a computing server 206 that needs to perform calculation and return a result indicating whether the vehicle 202 is inside or outside the predefined geofencing region. It should be noted that the vehicle 202, the fleet manager 204, and the computing server 206 may be analogous to the vehicle 112, the fleet manager 108, and the computing server 110 of the system 100.

In order to determine if the vehicle 202 is within a predefined geofencing region, the computing server 206 may run a Pythagorean Theorem-based algorithm. Upon running this algorithm, the computing server 206 may provide a computed result in a form of numbers that may represent whether the location is inside, outside, or on geofence without knowing actual location of the vehicle 202. As an example, consider a circle (representing the predefined geofencing region) with radius 'r', center A ($x_a$, $y_a$), and a random point (x, y) on the circle, then the Pythagorean theorem may be represented as depicted via an equation (1):

$$x^2 + y^2 = r^2 \tag{1}$$

The Pythagorean theorem as represented in equation (1) may be further extended to determine if the random point (x, y) is inside, outside, or on the circle, the extended form of Pythagorean theorem may be represented as depicted via an equation (2):

$$f(x, y) = (x - x_a)^2 + (y - y_a)^2 - r^2 \tag{2}$$

with the following outcomes:

f (x, y)=0 if Point (P) lies on the circle f (x, y)<0 if P is inside the circle f (x, y)>0 if P is outside the circle In some embodiments, the above outcomes obtained from the equation (2) may be one or more geofencing criteria for determining whether the vehicle 202 is inside or outside the predefined geofencing region. It may be noted that the techniques described in the present disclosure may be applicable to any type of fencing area (for example, rectangle, polygons, square, or any other shape). For other type of fencing area, the Pythagorean theorem-based algorithm may be modified depending on shape of the fencing area. With reference to FIG. 1, the present disclosure may provide geofencing details of the fencing areas that may be represented by a center point and a distance as an input to the privacy preserving device 102 to define the pre-defined geofencing region for the vehicle. Further, an authentication and standard encryption may be needed for all the three parties to securely communicate with each other. It may be assumed that such techniques may be standard and therefore, the present disclosure may only describe the techniques which may be novel i.e., techniques for the privacy preserving geofencing.

Therefore, to begin with the privacy preserving geofencing process, initially, the vehicle 202 may share the current location data to the fleet manager 204. It may be noted that prior to sharing of the current location data to the fleet manager 204, the current location data may be homomorphically encrypted through the homomorphic encryption technique. In some embodiments, the vehicle 202 may include a trusted platform module that may be configured to provide a cryptographic access point application programming interface (API) for homomorphically encrypting the current location data of the vehicle 202.

For sake of simplicity, consider that the current location of the vehicle 202 is at some random point (x, y) on the circle. The circle may denote the pre-defined geofencing region. Thus, in order to securely determine whether the point (x, y) is inside or outside the circle without affecting the user's privacy, the vehicle 202 may share the current location data to the fleet manager 204 in the encrypted format.

It should be noted that, the homomorphic encryption technique may be a type of encryption technique that allow users to perform different computation on the encrypted data without having to decrypt it. For example, an encryption technique may be defined to be the homomorphic encryption technique when a given encryption function "E" takes key "k", and two numbers "$m_1$" and "$m_2$", the following equation (3) holds:

$$\forall\, m_1, m_2 \in M,\ E(m_1 \circ m_2) = E(m_1) \circ E(m_2) \tag{3}$$

Where "∘" may denote arithmetic operators, such as, multiplications, and additions. This means the result of operator "∘" on the encrypted "$m_1$" and encrypted "$m_2$" equals the result of operator "∘" on the plaintext "$m_1$" and plaintext "$m_2$". As will be appreciated, the homomorphic encryption technique may use a Cheon-Kim-Kim-Song (CKKS) scheme as this scheme may be suitable for arithmetic on real numbers, which may give approximate but close results, while other schemes (for example, Brakerski-Fan-Vercauteren (BFV)) may be more suited for arithmetic on integers. The CKKS may use public key encryption scheme. This means a secret key and a public key may be generated. The public key may be used for encryption and can be shared, while the private key must be kept secret and may be used for decryption.

In the Pythagorean theorem-based algorithm, the center A ($x_a$, $y_a$) and the radius 'r' may be in a plain text or encrypted depending on settings (i.e., whether the user wants to keep the information of the fencing area secret from the computing server 206). However, the current geographic location at the point (x, y) may be encrypted. The computing server 206 may run the Pythagorean theorem-based algorithm on this input to homomorphically calculate the result (in encrypted form) that indicates whether the given location is inside, or outside a given fencing area.

Upon receiving the current location data in the encrypted format, the fleet manager 204 may randomly generate at least two secure values (for example, a $sec\_num_1$ and a $sec\_num_2$) corresponding to the current location data of the vehicle 202. Further, the fleet manager 204 may combine the at least two secure numbers with the current location data of the vehicle 202. Thereafter, the fleet manager 204 may share a combination of the current location data and the at least two secure numbers to the computing server 206.

Further, the computing server 206 may compute the current location data of the vehicle 202 obfuscated with the at least two secure numbers to obtain the computed result. The computed result may determine if the vehicle 202 is within the predefined geofencing region based on the one or more geofencing criteria.

By way of an example, in order to determine whether the vehicle 202 is inside or outside the predefined geofencing region or the circle, the computing server 206 may run the Pythagorean theorem-based algorithm on encrypted x, and encrypted y of point (x, y). As the Pythagorean theorem-based algorithm only uses subtraction and multiplication (for example, $x^2=x*x$), the computation may be done on homomorphically encrypted data. The computed result may be in a form of numbers (positive, negative, or zero) which may represent if the vehicle 202 is inside, outside, or on the geofence respectively.

In order to make it practically impossible for the user to falsify the computed result without being noticed, the computing server 206 may add the computed result with the at least two secure values (for example, secure number 1 and secure number 2), thereby obtaining the computed result in a form of '$r_1$' and '$r_2$', respectively before sharing it with the vehicle 202. The computed result with the secure number 1 may be represented as: '$r_1=r+sec\_num_1$'. Similarly, the computed result with the secure number 2 may be represented as: '$r_2=r+sec\_num_2$'.

Further, the computing server 206 may share the computed result to the user of the vehicle 202. It may be noted that the computed result shared with the user may still be in the encrypted form. Further, the vehicle 202 may decrypt the computed result ($r_1$ and $r_2$). The decrypting may provide the computed result in a plain-text format. It should be noted that the computed result may be decrypted without revealing to the user whether the vehicle 202 is within or outside of the predefined geofencing region. In other words, the computed result shared by the computing server 206 may not be readable to the user due to the presence of secure random number 1 and secure random number 2.

Further, the vehicle 202 may share the plain-text format of the computed result to the fleet manager 204. The fleet manager 204 may further subtract the two secure values (i.e., the secure number 1 and the secure number 2) from the computed result ($r_1$ and $r_2$) to verify if the computed result shared by the vehicle 202 is correct. As an example, in order to verify that the computed result is correct, the fleet manager 204 may generate two variables ($d_1$ and $d_2$) corresponding to each of the computed result. The two variables may be represented as depicted via an equation (4) and an equation (5):

$$d_1 = r_1 - \text{sec\_num}_1; \tag{4}$$

-continued $$\text{and } d_2 = r_2 - \text{sec\_num}_2 \tag{5}$$

In an embodiment, the verification may be performed by comparing the equation (4) and (5). On comparing, the following outcomes may be obtained: If $d_1=d_2$, then the vehicle 202 may report correct computed result, otherwise the computed result have been falsified. If $d_1=d_2<0$, then the vehicle 202 may be inside the predefined geofencing region. If $d_1=d_2>0$, then the vehicle 202 may be outside the predefined geofencing region. If $d_1=d_2=0$, then the vehicle 202 may be on the border of the predefined geofencing region.

In some embodiments, the above outcomes obtained from equation (4) and equation (5) may be the one or more geofencing criteria for determining whether the vehicle 202 is within or outside of the predefined geofencing region. In some embodiments, if the vehicle 202 is found to be outside of the predefined geofencing region, then the vehicle 202 may be stopped through an immobilizer which is installed in the vehicle 202. This is further explained in conjunction with FIG. 3.

Figure 3:
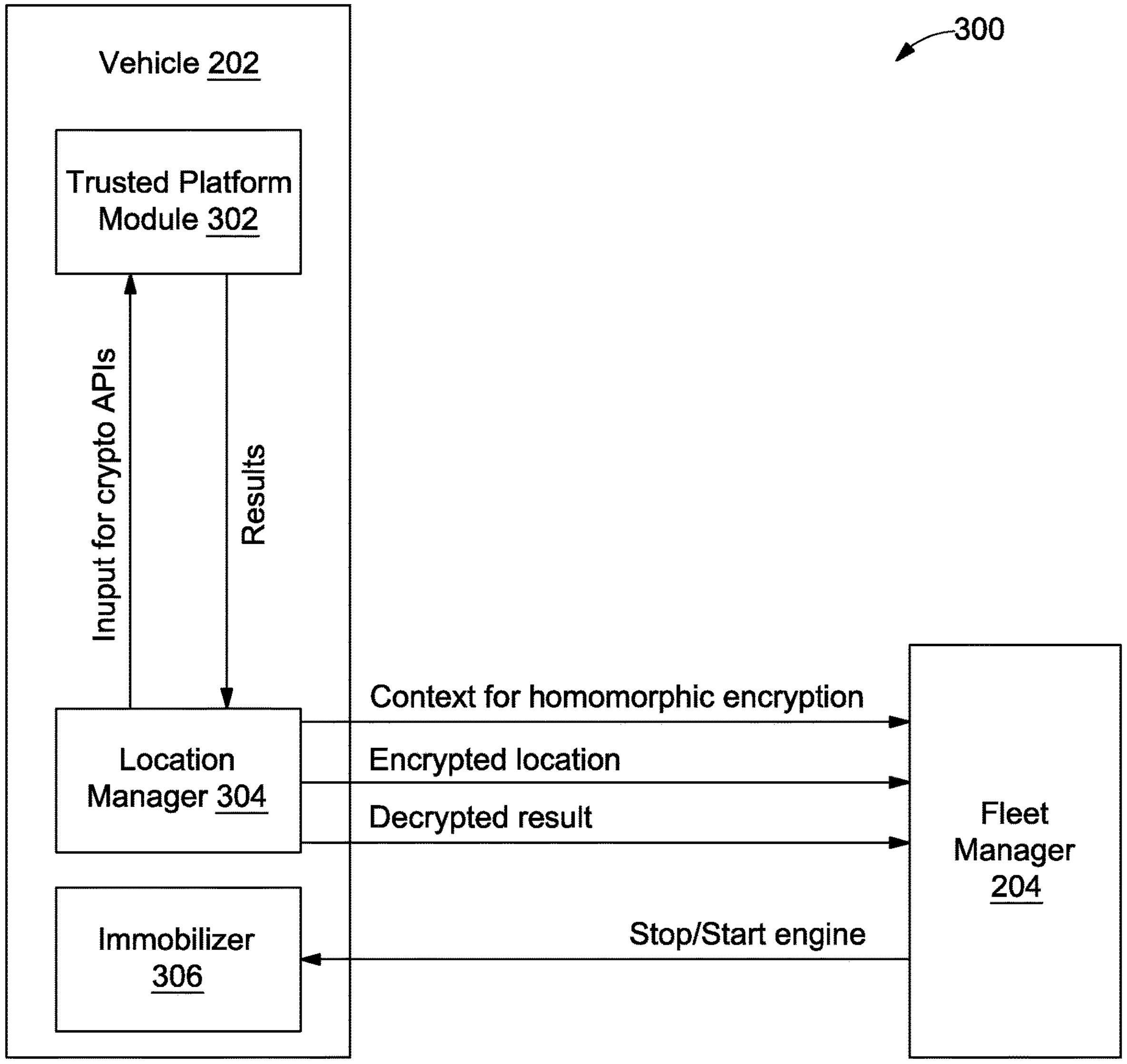
FIG. 3 is a block diagram of a process flow between vehicle and fleet manager for privacy preserving geofencing, in accordance with some embodiments of the present disclosure.

Referring now to FIG. 3, a block diagram 300 of a process flow between a vehicle 202 and a fleet manager 204 for privacy preserving geofencing is illustrated, in accordance with some embodiments of the present disclosure. The vehicle 202 may include a plurality of components. The plurality of components may include a trusted platform module 302, a location manager 304, and an immobilizer 306.

As mentioned earlier, the vehicle 202 may first homomorphically encrypt the current location data before sharing to the fleet manager 204. Therefore, this may be done by the trusted platform module 302. In particular, the trusted platform module 302 may provide a cryptographic API for homomorphically encrypting the current location data of the vehicle 202.

Further, the location manager 304 may be configured to share encrypted current location data of the vehicle 202 with the fleet manager 204 periodically. In addition to this, the location manager 304 may also be responsible for setting up a context for homomorphic encryption using the cryptographic API provided by the trusted platform module 302 with appropriate parameters such that the encrypted current location data may be secured against adversaries while still allows homomorphic computations (for example, multiplication and addition). Further, the context may be shared with the fleet manager 204.

Once the computed result is obtained and if the vehicle 202 is found to be outside of the predefined geofencing region, then in that case the vehicle 202 may send command to the immobilizer 306 to switch off an engine of the vehicle 202 and may alert the owner or the user of the vehicle 202 at a same time. This may prevent the vehicle 202 from theft or may prevent passenger from mishappening.

The fleet manager 204 may be a web application that may be required to periodically check if the vehicle 202 is inside the predefined geofencing region. To this end, the fleet manager 204 may perform one or more functionalities that may include receiving homomorphic encryption context shared by the location manager 304 of the vehicle 202. This may help the computing server 206 to perform homomorphic operations (for example, multiplication and addition) on the encrypted location data. Further, the one or more functionalities may include receiving the encrypted current location data shared by the location manager 304 of the vehicle 202, randomly generating two secure numbers, sending encrypted location data with the two secure numbers to the computing server 206, and receiving decrypted results shared by the vehicle 202 at the end of computation.

The computing server 206 may be deployed on a cloud where trust may not be mandatory. Similar to the fleet manager 204, the computing server 206 may also perform one or more functionalities that may include receiving the encrypted current location data and the two secure numbers from the fleet manager 204, computing the encrypted location data by running the Pythagorean theorem-based algorithm on the encrypted current location data to obtain the computed result in the encrypted format indicating if the location is within the predefined geofencing region, and sending the computed result from the computing server 206. to the vehicle 202.

It should be noted that all such aforementioned components 302-306 may be represented as a single component or a combination of different components. Further, as will be appreciated by those skilled in the art, each of the components 302-306 may reside, in whole or in parts, on one device or multiple devices in communication with each other. In some embodiments, each of the components 302-306 may be implemented as dedicated hardware circuit comprising custom application-specific integrated circuit (ASIC) or gate arrays, off-the-shelf semiconductors such as logic chips, transistors, or other discrete components. Each of the components 302-306 may also be implemented in a programmable hardware device such as a field programmable gate array (FPGA), programmable array logic, programmable logic device, and so forth. Alternatively, each of the components 302-306 may be implemented in software for execution by various types of processors (e.g., processor 106). An identified component of executable code may, for instance, include one or more physical or logical blocks of computer instructions, which may, for instance, be organized as an object, procedure, function, or other construct. Nevertheless, the executables of an identified component need not be physically located together but may include disparate instructions stored in different locations which, when joined logically together, include the component and achieve the stated purpose of the component. Indeed, a component of executable code could be a single instruction, or many instructions, and may even be distributed over several different code segments, among different applications, and across several memory devices.

Figure 4:
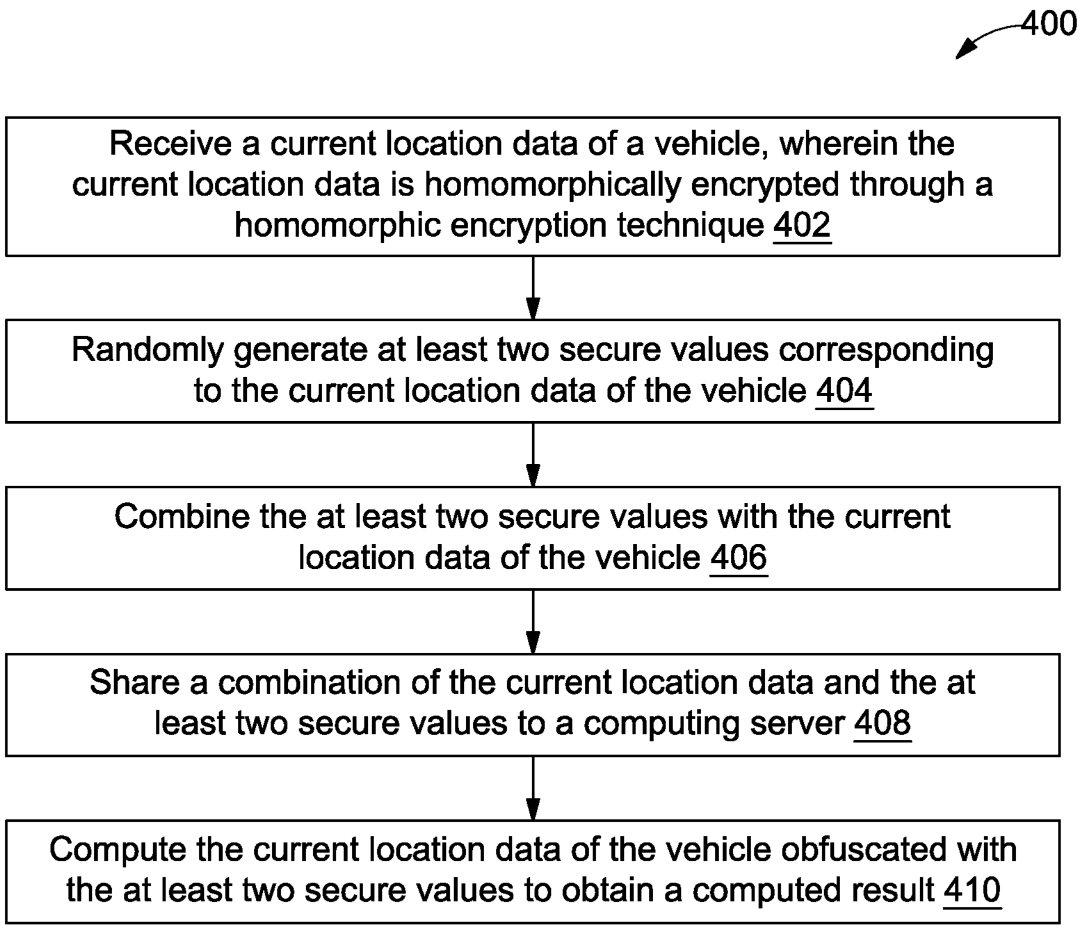
FIG. 4 illustrates a flow diagram of a privacy preserving geofencing method, in accordance with some embodiments of the present disclosure.

Referring now to FIG. 4, a flow diagram of a privacy preserving geofencing method 400 is illustrated, in accordance with some embodiments of the present disclosure. At step 402, a fleet manager (same as the fleet manager 108) may receive a current location data of a vehicle (same as the vehicle 112). It may be noted that the current location data may be homomorphically encrypted through a homomorphic encryption technique. In some embodiments, the vehicle may include a trusted platform module (same as the trusted platform module 302) configured to provide a cryptographic API for homomorphically encrypting the current location data of the vehicle.

At step 404, the fleet manager may randomly generate at least two secure values corresponding to the current location data of the vehicle. Further, at step 406, the fleet manager may combine the at least two secure values with the current location data of the vehicle. Further, at step 408, the fleet manager may share a combination of the current location data and the at least two secure values to a computing server (same as the computing server 110).

At step 410, the computing server may compute the current location data of the vehicle obfuscated with the at least two secure values to obtain a computed result. The computed result may determine if the vehicle is within a predefined geofencing region based on one or more geofencing criteria.

In some embodiments, the computing server may further share the computed result to a user of the vehicle in an encrypted format. Further, the vehicle may decrypt the computed result. The decrypting may provide the computed result in a plain-text format. It may be noted that the computed result may be decrypted without revealing to the user whether the vehicle is within or outside the predefined geofencing region.

Further, the vehicle may share the plain-text format of the computed result to the fleet manager. The fleet manager may further subtract the at least two secure values from the computed result. Upon subtracting, the fleet manager may verify if the computed result shared by the vehicle is correctly computed.

In some embodiments, the verification may be performed by comparing the computed result with the one or more geofencing criteria. This has been already explained in greater detail in conjunction with FIG. 2. In some embodiments, the vehicle may be halted by an immobilizer when the vehicle reaches outside of the predefined geofencing region.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
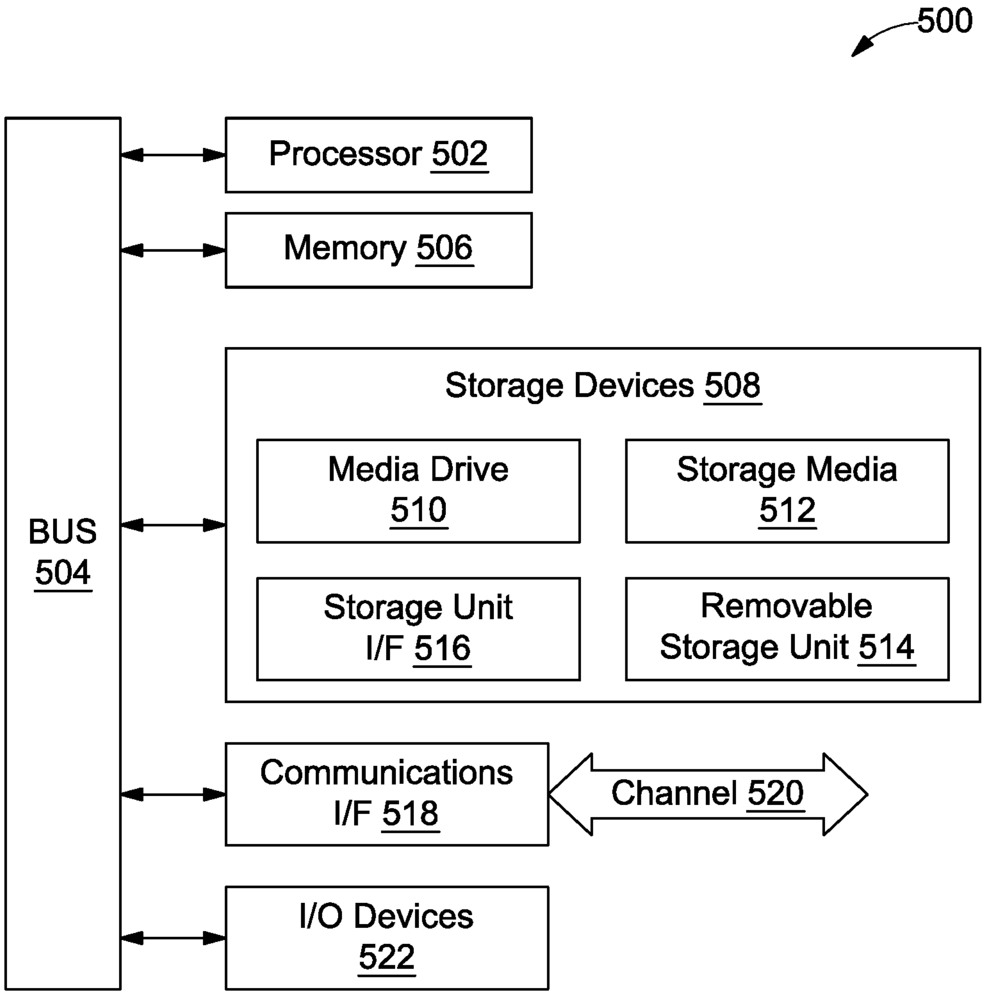
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, an exemplary computing system 500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 500 may represent, for example, a user device such as a desktop, a laptop, a mobile phone, personal entertainment device, DVR, and so on, or any other type of special or general-purpose computing device as may be desirable or appropriate for a given application or environment. The computing system 500 may include one or more processors, such as a processor 502 that may be implemented using a general or special purpose processing engine such as, for example, a microprocessor, microcontroller or other control logic. In this example, the processor 502 is connected to a bus 504 or other communication medium. In some embodiments, the processor 502 may be an Artificial Intelligence (AI) processor, which may be implemented as a Tensor Processing Unit (TPU), or a graphical processor unit, or a custom programmable solution Field-Programmable Gate Array (FPGA).

The computing system 500 may also include a memory 506 (main memory), for example, Random Access Memory (RAM) or other dynamic memory, for storing information and instructions to be executed by the processor 502. The memory 506 also may be used for storing temporary variables or other intermediate information during execution of instructions to be executed by the processor 502. The computing system 500 may likewise include a read only memory ("ROM") or other static storage device coupled to bus 504 for storing static information and instructions for the processor 502.

The computing system 500 may also include a storage device 508, which may include, for example, a media drives 510 and a removable storage interface. The media drive 510 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 512 may include, for example, a hard disk, magnetic tape, flash drive, or other fixed or removable medium that is read by and written to by the media drive 510. As these examples illustrate, the storage media 512 may include a computer-readable storage medium having stored there in particular computer software or data.

In alternative embodiments, the storage devices 508 may include other similar instrumentalities for allowing computer programs or other instructions or data to be loaded into the computing system 500. Such instrumentalities may include, for example, a removable storage unit 514 and a storage unit interface 516, such as a program cartridge and cartridge interface, a removable memory (for example, a flash memory or other removable memory module) and memory slot, and other removable storage units and interfaces that allow software and data to be transferred from the removable storage unit 514 to the computing system 500.

The computing system 500 may also include a communications interface 518. The communications interface 518 may be used to allow software and data to be transferred between the computing system 500 and external devices. Examples of the communications interface 518 may include a network interface (such as an Ethernet or other NIC card), a communications port (such as for example, a USB port, a micro-USB port), Near field Communication (NFC), etc. Software and data transferred via the communications interface 518 are in the form of signals which may be electronic, electromagnetic, optical, or other signals capable of being received by the communications interface 518. These signals are provided to the communications interface 518 via a channel 520. The channel 520 may carry signals and may be implemented using a wireless medium, wire or cable, fiber optics, or other communications medium. Some examples of the channel 520 may include a phone line, a cellular phone link, an RF link, a Bluetooth link, a network interface, a local or wide area network, and other communications channels.

The computing system 500 may further include Input/Output (I/O) devices 522. Examples may include, but are not limited to a display, keypad, microphone, audio speakers, vibrating motor, LED lights, etc. The I/O devices 522 may receive input from a user and also display an output of the computation performed by the processor 502. In this document, the terms "computer program product" and "computer-readable medium" may be used generally to refer to media such as, for example, the memory 506, the storage devices 508, the removable storage unit 514, or signal(s) on the channel 520. These and other forms of computer-readable media may be involved in providing one or more sequences of one or more instructions to the processor 502 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into the computing system 500 using, for example, the removable storage unit 514, the media drive 510 or the communications interface 518. The control logic (in this example, software instructions or computer program code), when executed by the processor 502, causes the processor 502 to perform the functions of the invention as described herein.

Thus, the disclosed method and system try to overcome the technical problem of preserving user's privacy by not revealing the user location data to any of the party involved. The disclosed method and system may employ homomorphic encryption techniques on the computations of user's geographic location. The homomorphic encryption may allow computation on encrypted data without having to decrypt it. Only the party that possess the encryption key may have a right to decrypt and read the data. Therefore, encrypting location before sharing with a computing server protects user's privacy.

As will be appreciated by those skilled in the art, the techniques described in the various embodiments discussed above are not routine, or conventional or well understood in the art. The techniques discussed above may be capable of preserving privacy of the user. In particular, only the vehicle may know its location, other parties only receive encrypted data, without having a corresponding encryption key (of the vehicle), it may be not possible to decrypt and learn the vehicle's location. Further, the communication scheme discussed above may be efficient and do not require multiple back and forth communication between the vehicle and the computing server in order to determine the result indicating whether the vehicle is inside, or outside of the predefined geofencing region. Further, use of (new) secure numbers that may be randomly generated may ensure that the vehicle reports the correct decrypted data while the computing server may not relay the shared data. Furthermore, even if data associated with the vehicle location (on the computing server) is stolen, it may be practically impossible for hackers to learn vehicle's location as the vehicle's location data is encrypted even during computation using above discussed technique.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described system and method for privacy preserving geofencing. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A privacy preserving geofencing method, the method comprising:

receiving, by a fleet manager of a privacy preserving device, a current location data of a vehicle, wherein the current location data is homomorphically encrypted through a homomorphic encryption technique;

randomly generating, by the fleet manager, at least two secure values corresponding to the current location data of the vehicle;

combining, by the fleet manager, the at least two secure values with the current location data of the vehicle;

sharing, by the fleet manager, a combination of the current location data and the at least two secure values to a computing server;

computing, by the computing server, the current location data of the vehicle obfuscated with the at least two secure values to obtain a computed result, wherein the computed result determines if the vehicle is within a predefined geofencing region based on one or more geofencing criteria;

sharing, by the computing server, the computed result to a user of the vehicle in an encrypted form; and decrypting, by the vehicle, the computed result, wherein decrypting provides the computed result in a plain-text format, and wherein the computed result is decrypted without revealing to the user whether the vehicle is within or outside the predefined geofencing region.

2. The method of claim 1 further comprises:

sharing, by the vehicle, the plain-text format of the computed result to the fleet manager;

subtracting, by the fleet manager, the at least two secure values from the computed result; and upon subtracting, verifying, by the fleet manager, if the computed result shared by the vehicle is correctly computed.

3. The method of claim 2, wherein verifying comprises comparing the computed result with the one or more geofencing criteria.

4. The method of claim 1, further comprises halting the vehicle through an immobilizer installed in the vehicle when the vehicle reaches outside of the predefined geofencing region.

5. The method of claim 1, wherein the vehicle comprises a trusted platform module configured to provide a cryptographic access point application programming interface (API) for homomorphically encrypting the current location data of the vehicle.

6. A privacy preserving geofencing system, the system comprising:

a processor; and a memory communicatively coupled to the processor, wherein the memory stores processor instructions, which when executed by the processor, cause the processor to:

receive a current location data of a vehicle, wherein the current location data is homomorphically encrypted through a homomorphic encryption technique;

randomly generate at least two secure values corresponding to the current location data of the vehicle;

combine the at least two secure values with the current location data of the vehicle;

share a combination of the current location data and the at least two secure values to a computing server;

compute the current location data of the vehicle obfuscated with the at least two secure values to obtain a computed result, wherein the computed result determines if the vehicle is within a predefined geofencing region based on one or more geofencing criteria;

share the computed result to a user of the vehicle in an encrypted form; and decrypt the computed result, wherein decrypting provides the computed result in a plain-text format, and wherein the computed result is decrypted without revealing to the user whether the vehicle is within or outside the predefined geofencing region.

7. The system of claim 6, wherein the processor instructions, when executed by the processor, further cause the processor to:

share the plain-text format of the computed result to the fleet manager;

subtract the at least two secure values from the computed result; and upon subtraction, verify if the computed result shared by the vehicle is correctly computed.

8. The system of claim 7, wherein to verify if the computed result shared by the vehicle is correctly computed, the processor instructions, when executed by the processor, further cause the processor to compare the computed result with the one or more geofencing criteria halt the vehicle through an immobilizer installed in the vehicle when the vehicle reaches outside of the predefined geofencing region.

9. The system of claim 6, wherein the processor instructions, when executed by the processor, further cause the processor to halt the vehicle through an immobilizer installed in the vehicle when the vehicle reaches outside of the predefined geofencing region.

10. The system of claim 6, wherein the vehicle comprises a trusted platform module configured to provide a cryptographic access point application programming interface (API) for homomorphically encrypting the current location data of the vehicle.

11. A computer program product for privacy preserving geofencing, the computer program product being embodied in a non-transitory computer readable storage medium of a privacy preserving device and comprising computer instructions for:

receiving a current location data of a vehicle, wherein the current location data is homomorphically encrypted through a homomorphic encryption technique;

randomly generating at least two secure values corresponding to the current location data of the vehicle;

combining the at least two secure values with the current location data of the vehicle;

sharing a combination of the current location data and the at least two secure values to a computing server;

computing the current location data of the vehicle obfuscated with the at least two secure values to obtain a computed result, wherein the computed result determines if the vehicle is within a predefined geofencing region based on one or more geofencing criteria sharing the computed result to a user of the vehicle in an encrypted form; and decrypting the computed result, wherein decrypting provides the computed result in a plain-text format, and wherein the computed result is decrypted without revealing to the user whether the vehicle is within or outside the predefined geofencing region.

12. The computer program product of claim 11, wherein the computer instructions further configured for:

sharing the plain-text format of the computed result to the fleet manager;

subtracting the at least two secure values from the computed result; and upon subtracting, verifying if the computed result shared by the vehicle is correctly computed.

13. The computer program product of claim 12, wherein verifying comprises comparing the computed result with the one or more geofencing criteria.

14. The computer program product of claim 11, wherein the computer instructions further configured for halting the vehicle through an immobilizer installed in the vehicle when the vehicle reaches outside of the predefined geofencing region.

15. The computer program product of claim 11, wherein the vehicle comprises a trusted platform module configured to provide a cryptographic access point application programming interface (API) for homomorphically encrypting the current location data of the vehicle.

* * * * *